US012613917B1

(12) United States Patent
Singh et al.

(10) Patent No.: US 12,613,917 B1
(45) Date of Patent: Apr. 28, 2026

(54) GENERATING GRAPH DATABASES USING LARGE LANGUAGE MODELS

(71) Applicant: Morgan Stanley Services Group Inc., New York, NY (US)

(72) Inventors: Ashish Singh, Karnataka (IN); Sanjit Vijay Mehta, Bengaluru (IN); Asmita Bhattacharya, Basavanagara (IN); Ankita Joshi, Bengaluru (IN); Punerva Singh, Ghaziabad (IN); Abhijit Naik, Nagpur (IN)

(73) Assignee: Morgan Stanley Services Group Inc., New York, NY (US)

( * ) Notice: Subject to any disclaimer, the term of this patent is extended or adjusted under 35 U.S.C. 154(b) by 0 days.

(21) Appl. No.: 19/179,570

(22) Filed: Apr. 15, 2025

(51) Int. Cl.
G06F 16/901 (2019.01)
G06F 16/242 (2019.01)
G06F 16/25 (2019.01)

(52) U.S. Cl.
CPC ........ G06F 16/9024 (2019.01); G06F 16/242 (2019.01); G06F 16/258 (2019.01)

(58) Field of Classification Search
None
See application file for complete search history.

(56) References Cited

U.S. PATENT DOCUMENTS

| | | | |
|---|---|---|---|
| 5,201,046 A | 4/1993 | Goldberg et al. | |
| 5,806,066 A | 9/1998 | Golshani et al. | |
| 10,437,564 B1 | 10/2019 | Periwal | |
| 12,051,205 B1 * | 7/2024 | Deutsch | G06T 7/10 |
| 12,072,918 B1 | 8/2024 | Newman et al. | |
| 2003/0069877 A1 * | 4/2003 | Grefenstette | G06F 16/3323 |
| 2006/0190225 A1 | 8/2006 | Brand | |
| 2006/0246879 A1 * | 11/2006 | Miller | H04L 69/04 |
| | | | 455/414.1 |
| 2011/0246530 A1 * | 10/2011 | Malafsky | G06N 5/022 |
| | | | 707/794 |
| 2016/0092527 A1 | 3/2016 | Kang et al. | |
| 2016/0092554 A1 | 3/2016 | Srinivasan et al. | |
| 2016/0092596 A1 | 3/2016 | Kim et al. | |
| 2022/0237446 A1 | 7/2022 | Lei et al. | |
| 2023/0102602 A1 | 3/2023 | Alesiani et al. | |
| 2024/0119067 A1 | 4/2024 | Shyam Sunder et al. | |
| 2024/0354322 A1 * | 10/2024 | Mukherjee | G06F 18/2415 |
| 2025/0005263 A1 * | 1/2025 | Mansour | G06F 40/134 |
| 2025/0095244 A1 * | 3/2025 | Papancea | G06T 11/206 |
| 2025/0111192 A1 * | 4/2025 | Bayless | G06N 3/006 |
| 2025/0131289 A1 * | 4/2025 | Larson | G06N 5/02 |

OTHER PUBLICATIONS

Sheldon, Robert and Yasar, Kinza. "What is an AI Prompt? | Definition from TechTarget." Published Nov. 13, 2024 by TechTarget. com. Accessed Jul. 1, 2025 from https://www.techtarget.com/searchenterpriseai/definition/AI-prompt (Year: 2024).*

* cited by examiner

*Primary Examiner* — Umar Mian
(74) *Attorney, Agent, or Firm* — Leason Ellis LLP

(57) ABSTRACT

A computer-implemented method for generating a graph database includes generating a prompt for input to a large language model (LLM) based on user input and stored metadata. The LLM is used to extract graph metadata from the prompt, generate a knowledge graph based on the graph metadata and additional sources of data, and further generate a graph data model including both structured and unstructured data using the knowledge graph. A graph platform is used to generating a graph using the graph data model.

8 Claims, 13 Drawing Sheets

GENERATING GRAPH DATABASES USING LARGE LANGUAGE MODELS

FIELD OF THE DISCLOSURE

The present disclosure relates to computer databases, and in particular relates to a method and system for generating graph databases using large language models.

BACKGROUND OF THE DISCLOSURE

Data in many organizations is currently stored in the form of relational databases or as unstructured or semi-structured data (the latter is referred to as "unstructured data" in this disclosure; however it should be understood that this term is meant to encompass semi-structured data such as ordered lists, or tagged data). As a main example, relational databases generate store data in tables having rows and columns. Related data can be stored in linked tables. Operations in relational databases tend to require multiple table lookups. Moreover, the schema of relational databases requires that relationships between tables are defined with primary and foreign keys. Relational Database Management Systems (RDBMS) that are designed to manage such structured data and are often not well-suited for handling complex relationships and large amounts of data. Likewise, certain "first-generation" machine learning algorithms, such as decision trees and neural networks, are often designed for specific tasks and may not provide a comprehensive understanding of the data. Traditional data visualization tools such as bar charts and scatter plots, are often limited in their ability to display complex relationships and large amounts of data.

In contrast, graph databases and their associated operations use graph structures having nodes, edges and properties. Nodes are entities, edges represent relationships between the nodes, and properties describe the attributes of the nodes and edges. The graph structure provides flexibility regarding relationships and data types. Due to their structure, graph databases represent complex relationships among data points in a more direct manner than relational databases. This feature makes it easier to visualize, navigate and index complex data using a graph format. Similarly, graph databases offer advantages in terms of scalability and extensibility when there are complex relationships embedded in the data.

With respect to unstructured data such as pdfs, documents, text files and audio and video files from which text can be transcribed, graph databases serve as a useful way to categorize and visualize relationships of data within such files.

Given the natural advantages of graph databases over relational databases and unstructured data for representing and storing complex data, it would be advantageous to be able to convert data presently embedded in relational databases and unstructured data to graph data structures. However, this is not a straightforward task given the different model schemas involved.

What is therefore needed is a way of generating graph databases from such unstructured data or relational database models into a comprehensive graph-based model.

SUMMARY OF THE DISCLOSURE

According to one aspect, the present disclosure describes A computer-implemented method for generating a graph database includes generating a prompt for input to a large language model (LLM) based on user input and stored metadata. The LLM is used to extract graph metadata from the prompt, generate a knowledge graph based on the graph metadata and additional sources of data, and further generate a graph data model including both structured and unstructured data using the knowledge graph. A graph platform is used to generating a graph using the graph data model.

In another aspect, the present disclosure describes a computer-implemented method of query generation using a query using an LLM query builder. The method includes inputting user input to the LLM query builder, the user input including initial text and a use case, extracting nodes, relationships and attributes from the user input, refining the nodes, relationships and attributes based on previously stored metadata, and configuring the query using additional information including one or more of: a metadata index, metadata vectorization, domain or sub-domain information related to the use case, and additional relevant structured or unstructured data. An output format of the query is also formatted and the output query is generated based on the refined nodes, relationships and attributes and additional configuring steps.

BRIEF DESCRIPTION OF THE DRAWINGS

FIG. 4C is an exemplary user interface screen which displays relationships and common attributes associated with the listed relationships.

FIG. 4D is an exemplary user interface that allows an operator to specify the CSV files that include the data for forming the knowledge graph.

DESCRIPTION OF CERTAIN EMBODIMENTS OF THE DISCLOSURE

The present disclosure describes a method for generating graph database using a large language model (LLM) from relational databases or unstructured data sources. LLMs are a category of generative artificial intelligence ("GenAI") models which have enhanced capabilities in interpreting data. The graph databases that are generated preserve and enhance the contextual and semantic meaning of the data, thereby enabling more intuitive and insightful data relationships, queries and analyses.

Converting Relational Database to Graph Databases

Figure 1:
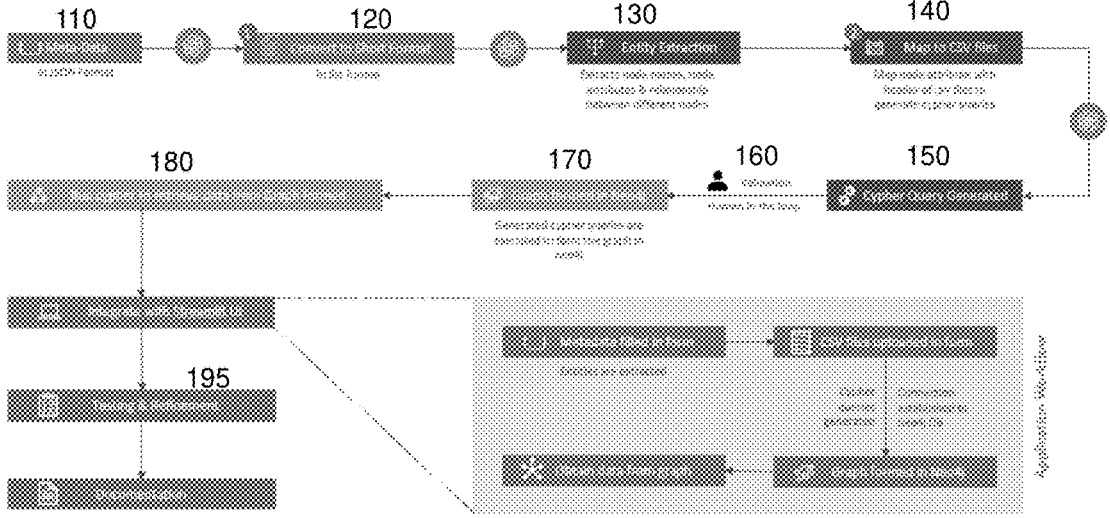
FIG. 1 is a flow diagram of an embodiment of a general method for converting a relational database to a graph database according to the present disclosure.

The following sections describe one important embodiment of the method of the present disclosure in which relational databases are converted to graph databases using an LLM. FIG. 1 is a flow diagram of an embodiment of a general method for converting a relational database to a graph database using an LLM according to the present disclosure. In a first step 110, metadata is obtained from the relational database in an object format, such as JSON (Java Script Object Notation). In a following step 120, the object format of the metadata is refined into a list format. Once the metadata is suitably formatted, it is input to an LLM (e.g., Chat GPT created and provided by OpenAI, Inc. of San Francisco, CA). The LLM extracts entities from the refined metadata in step 130. The entities extracted include nodes, attributes and relationships of the underlying data. After extraction of the entities, the metadata is temporarily mapped to a CSV (comma-separated values) or similar file in step 140. The CSV file stores data in a structured format using commas to separate values and distinct lines to separate records.

In step 150, one or more cypher queries are generated and input to the LLM to create a graph using the node, edge and relationship information previously extracted. In some implementations, the cypher queries are validated in step 160 by a human operator before converting to a graph database, however, in some implementations this step is not performed. In a following step 170, a graph database corresponding to the graph created by the LLM is formed in a graph database platform, such as Neo4j, by executing the validated query(s). Once the graph database is formed, cyphers can be executed to retrieve data from the graph database in step 180. The accuracy of the conversion can be tested and refined for incremental improvements in step 195.

Each of the method steps 110-180 shown in FIG. 1 are described in greater detail below. In addition, the entire process of steps 110-180 can be integrated in an application (shown as step 190) that employs user interface features and screens tailored to each of the steps as described further below.

With respect to step 110, the collection of meta-data of the relational database (RDB), the RDB meta-data is in the following format:

```
{Table Name: table_name,
Table Meaning: table_meaning,
Table Description: table_desc,
Columns: [
    {Column Name: col_name,
    Column Meaning: col_meaning,
    Column Description: col_desc
    }, . . .
}}
```

The following is one example of a list of tables that are included in the relational database:

i) PARTY
ii) PARTY_ADDR (Party Address)
iii) PARTY_CMPLNC (Party
iv) PARTY_EMPMT (Party Employment)
v) PARTY_ENRL (Pay Enrollment)
vi) PARTY_FA
vii) PARTY_SOW
viii) PARTY_TO_UUID
ix) PARTY_GOVT_ID
x) PARTY_OFC_ELTRNC_CNTC
xi) PARTY_PHN_ELTRNC_CNTC
xii) PARTY_PRFN_AFIL
xiii) PARTY_TO_PARTY The tables above comprise a main "Party" table and twelve (12) related attribute tables. An example of a specific table used as meta-data is that fits the format shown above is provided as follows:

```
{
    "TABLE NAME": "PARTY_ADDR",
    "TABLE MEANING": "PMH Party Address",
    "TABLE DESCRIPTION": "DDHI Daily Truncate
        Load Entire History|PADT standard file feed—Con-
        tains Party address details| NA Party Address table—
        sourced from PADT Standard Feed. This table pre-
        viously had only addresses for internal parties and
        going forward will also store external Parties that are
        sourced from the Party Hub;
    "COLUMNS": [
        {
            "COLUMN NAME": "TXT_ADDR_LNE_1",
            "COLUMN MEANING": "Address Line 1 Text",
            "COLUMN DESCRIPTION":" "
        },
        {
            "COLUMN NAME": "CDE_ADDR_KEY",
            "COLUMN MEANING": "CDE_ADDR_KEY",
            "COLUMN DESCRIPTION":" "
        },
        {
            "COLUMN NAME": "CDE_ST",
            "COLUMN MEANING": "CDE_ST",
            "COLUMN DESCRIPTION":" "
        }, . . .
    ]
}
```

In certain implementations of the method, the LLM has a limitation on the amount of data (e.g., the number of tokens) that it can accept as inputs. For example, the GPT4 model of Open AI, Inc. has a limitation of 8k tokens. Therefore, as noted above, the extracted meta-data is refined, in step 120, into a shorter format suitable for the LLM. One non-limiting example of a refined format of the same metadata is provided as follows:

1. Table: PARTY_ADDR
   Meaning: PMH Party Address
   Description: DDH|Daily Truncate Load Entire History|PADT standard file feed—Contains Party address details|NA Party Address table—sourced from PADT Standard Feed. This table till now had only address for MS Only Parties. Going forward, it will also store non-MS Parties that are sourced from the Party Hub and are not necessarily all MS clients but MS Prospects 2. Columns:
TXT_ADDR_LNE_1: Address Line 1 Text
CDE_ADDR_KEY: CDE_ADDR_KEY
CDE_ST: CDE_ST
CDE_ISO_CTRY: ISO Country Code
TXT_ADDR_LNE_3: Address Line 3 Text
CDE_POST: Postal Code
NME_CITY: City Name
TXT_ADDR_LNE_4: Address Line 4 Text
CDE_ZIP_4: Zip 4 Code
TXT_ST_DESC: State
CDE_ZIP_5: Zip 5 Code
TXT_ADDR_BRCDE: Address Barcode Text
TXT_ADDR_DESC: Address Description Text
NME_CNTRY: Country Name
IDN_PARTY: Party Identifier After the tabular metadata has been refined, in step 130 the LLM is used to extract the entities present in the meta-data. More specifically, the LLM is configured to recognize and extract nodes, attributes, relationship, common attributes, from the metadata. Responses of the LLM model can be improved by refining the prompts. Using the refined metadata example for the PARTY_ADDR table, the LLM outputs entity information in terms of a single node, a list of attributes and a single relationship which can be formatted as follows:

Node: PARTY_ADDR
Attributes: TXT_ADDR_LNE_1, CDE_ADDR_KEY, CDE_ST, CDE_ISO_CTRY, TXT_ADDR_LNE_3, CDE_POST, NME_CITY, TXT_ADDR_LNE_4, CDE_ZIP_4, TXT_ST_DESC, CDE_ZIP_5, TXT_ADDR_BRCDE, TXT_ADDR_DESC, NME_CNTRY, IDN_PARTY
RELATIONSHIP: PARTY_HAS_ADDR Prior to forming a query for the LLM, any personal identification information (PII) in the extracted entity data is preferably removed to prevent data breaches. Therefore, in step 140, the extracted entities are mapped to headers of CSV (comma separated value) files. This measure allows a knowledge graph database platform such as Neo4j to populate the knowledge graph with the extracted entity data. An example of a header of an csv file is provided as follows:

In PARTY_ADDR.csv:
"TXT_ADDR_LNE_1", "CDE_ADDR_KEY", "CDE_ST", "CDE_ISO_CTRY", "TXT_ADDR_L NE_3", "CDE_POST", "NME_CITY", "TXT_ADDR_LNE_4", "CDE_ZIP_4", "TXT_ST_ DESC", "CDE_ZIP_5", "TXT_ADDR_BRCDE", "TXT_ADDR_DESC", "NME_CNTRY", "IDN_ PARTY"

After mapping, cypher queries are generated in the knowledge graph database platform. For example, queries can be generated using the query language utilized by Neo4j which simplifies graph data manipulation, making it more intuitive and accessible. Example cypher queries formatted for the Neo4j platform are provided as follows:

1) CREATE (n:PARTY {IDN_PARTY: "1", CDE_TRST_GVRN_ST: "ST1", IDN_MS_EMP: "EMP1", IND_LMT_PRPRTY_ACTY: "Yes", TXT_GMBL_WAGE_BUS_DESC: "Desc1", TXT_GOV-T_ENTY_TYP_DESC: "Type1", DT2_END: "2023-01-01", IND_NEST_ACCT_DWNSTR_CRSPDT: "Yes", IND_PEP_FAM_MBR: "No", IND_RETL_AGGRT_SVC: "Yes", IND_PUB_TRD: "No", CDE_CHTR_LIC_ISS_CNTRY: "US", IND_SPCL_NEED_TRST: "No", IND_PRNT_CO_EXST: "Yes", NME_EDD_DUAL_CTZ_CNTRY: "US", CDE_INC_ST: "ST1", IND_SOVGN_WLTH_FND: "No", TXT_RED_FLAG_RSN: "Reason1", NME_PRNT_CO: "ParentCol", TXT_MSAI_FEE: "Feel", CDE_NAICS_VRF: "VRF1", IND_NRC: "No", CDE_RED_FLAG: "Red1", DT2_BIRTH: "1980-01-01", NME_ORG: "Orgl", CDE_MS_EMP: "EMP1", TXT_PARTY_SBTY_DESC: "Subtype1", NME_PFX: "Mr.", IND_PEP_CLOS_ASSOC: "No", TXT_CLA_REG: "Reg1"});
2) CREATE (n:PARTY_ADDR {TXT_ADDR_LNE_1: "123 Main St", CDE_ADDR_KEY: "AK123", CDE_ST: "AK", CDE_ISO_CTRY: "US", TXT_ADDR_LNE_3: "Suite 1", CDE_POST: "99501", NME_CITY: "Anchorage", TXT_ADDR_LNE_4: "Floor 2", CDE_ZIP_4: "1234", TXT_ST_DESC: "Alaska", CDE_ZIP_5: "99501", TXT_ADDR_BRCDE: "123456789", TXT_ADDR_DESC: "Office Address", NME_CN-TRY: "United States", IDN_PARTY: "1"});

The optional step of operator validation adds assurance that the query results are complete and accurate and that they also fulfil requirements. This information can be used by the knowledge graph database platform to improve the query process.

Figure 2:
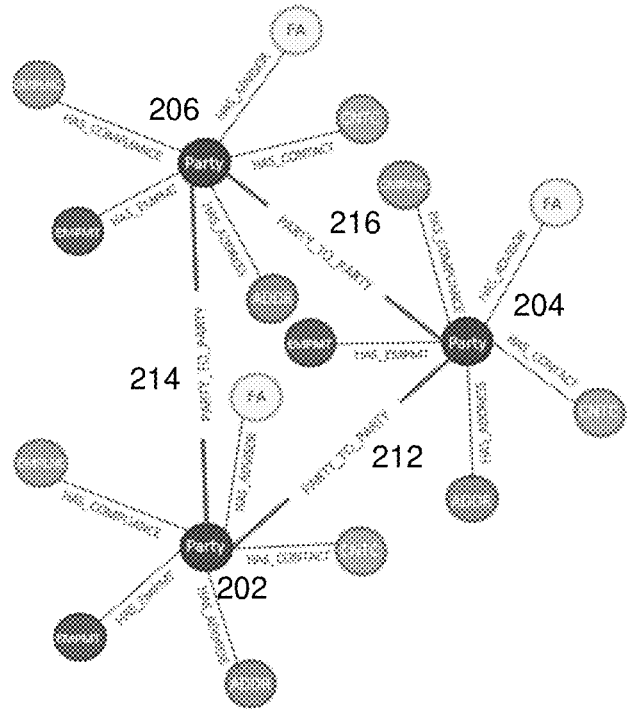
FIG. 2 is an example graph containing nodes, attributes and relationships that can be produced from relational database data according to embodiments of the methods of the present disclosure.

Cypher queries, preferably validated, can be executed to form graphs in the graph database platform such as shown in FIG. 2. This graph shows throw three distinct Party nodes 202, 204, 206. Party nodes 202 and 204 are connected by relationship 212, Party nodes 202 and 206 are connected by relationship 214 and Party node 204 and 206 are connected by relationship 216. Each of the Party nodes 202, 204, 206 includes a number of attributes (e.g., FA, ADDR) which branch off of each respective Party node.

Figure 3:
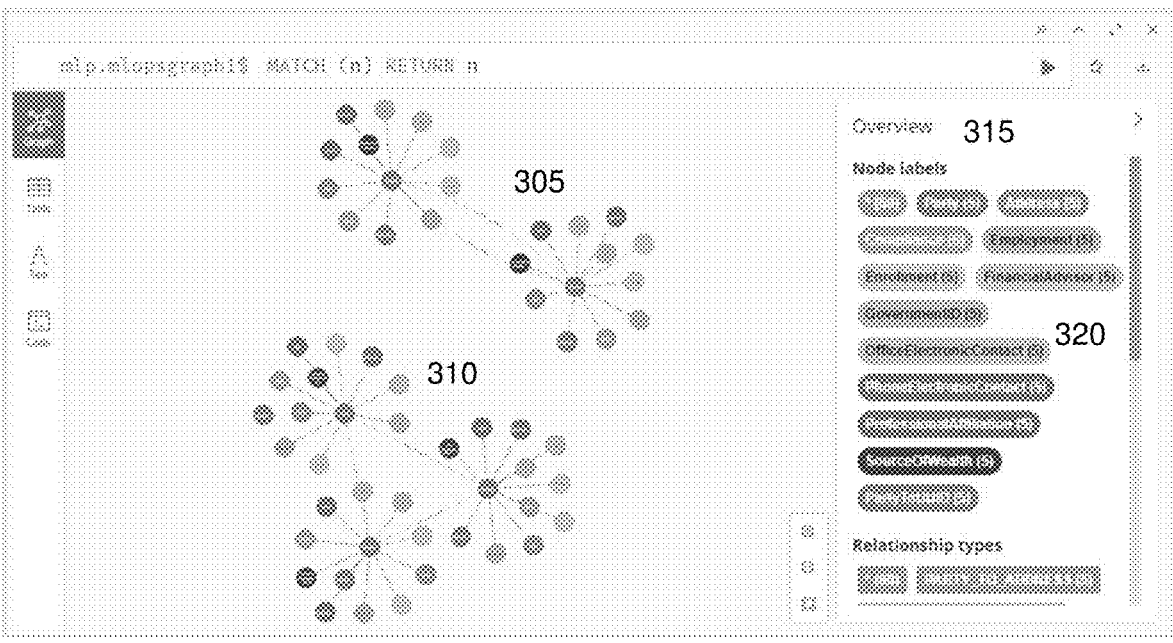
FIG. 3 is an example illustration of an interface of a graph database platform including a depiction of distinct graphs.

FIG. 3 is an example illustration of an interface of a graph database platform including a depiction of distinct graphs 305, 310 obtained from relational database metadata. An overview panel on the side of the interface lists the node labels 320 presented in the graphs 305, 310, among other information.

Once in graph form, any number of different graph algorithms can be used to interpret the data. Shortest Path algorithms (e.g., Dijkstra's algorithm, Bellman-Ford algorithm) can be used to find the shortest path between nodes. Graph traversal algorithms (e.g., Depth-First Search, Breadth-Ford algorithm) can be used to o visit nodes in a graph systematically. Additionally, Community Detection methods (e.g., Louvain method, Girvan-Newman algorithm) can be used to identify groups of nodes that are more densely connected to each other than to the rest of the graph.

Furthermore, there are a number of machine learning techniques specifically adapted to knowledge graphs. Firstly, features derived from graph properties (e.g., node degree, clustering coefficient) can be used in traditional ML models. Graph Embeddings (e.g., Node2Vec, DeepWalk, GraphSAGE) are techniques that represent nodes as low-dimensional vectors which capture graph structure. Graph Neural Networks (GNNs), such as Graph Convolutional Networks (GCNs) extend the convolution operation to graph data, allowing feature learning from graph structures and Graph Attention Networks (GATs) use attention mechanisms to weigh the importance of neighbouring nodes. In addition, Message Passing Neural Networks (MPNNs) provide a framework in which nodes exchange messages and update their states based on neighbouring nodes. These techniques enable many useful applications including social network analysis, systematized knowledge graphs for search engines and answering systems, and natural language processing and computer vision.

Figures 4A, 4B:
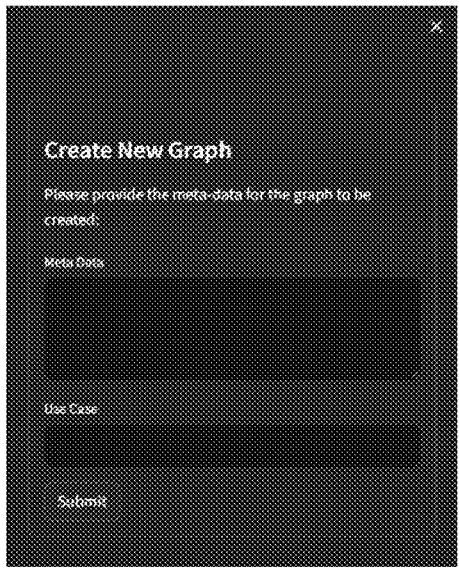
FIG. 4A is an exemplary user interface for enabling an operator to input a meta-data and use-case for a relational database-to-knowledge graph conversion.
FIG. 4B is an exemplary user interface screen which displays entities that have been extracted from the meta data.
Figures 4C, 4D:
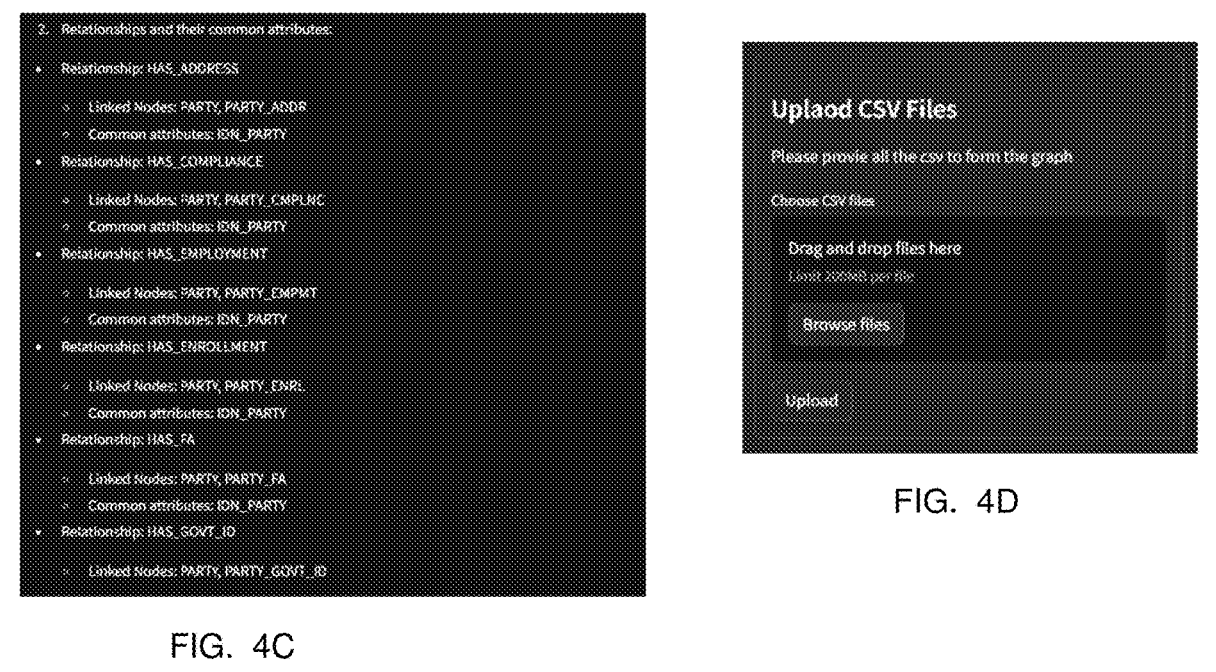
Figure 4E:
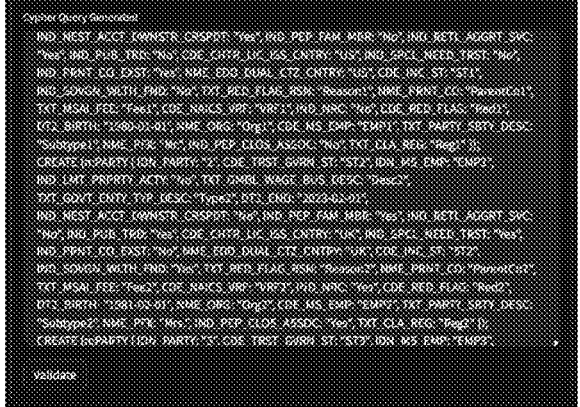
FIG. 4E is an exemplary user interface that displays a cypher query generated from the CSV file uploaded through the interface of FIG. 4D.
Figure 4F:
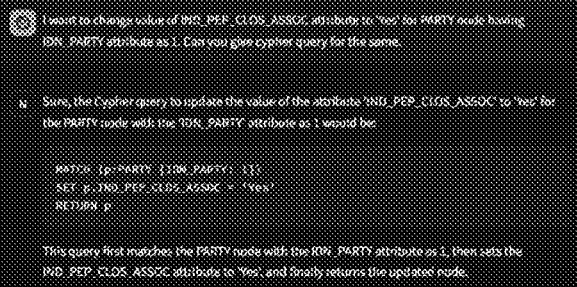
FIG. 4F is an exemplary user interface that provides the operator with the ability to make changes to the graph formed based on the executed cypher query.
Figure 4G:
FIG. 4G is an exemplary user interface that allows an operator to input additional nodes, attributes, labels and relationships to modify an existing graph or to prepare a new graph.

A stream-lit application including several user interfaces can be employed to guide operators through the steps of the method described above. FIGS. 4A-4G illustrate examples of such user interfaces. FIG. 4A is an exemplary user interface for enabling an operator to input a meta-data and use-case for a relational database-to-knowledge graph conversion. FIG. 4B is a user interface screen which displays entities that have been extracted from the meta data. FIG. 4C is a user interface screen which displays relationships and common attributes associated with the listed relationships. FIG. 4D is a user interface that allows an operator to specify the CSV files that include the data for forming the knowledge graph. The interface of FIG. 4D allows both drag and drop and browsing functionality to upload the CSV file. The user interface shown in FIG. 4E displays a cypher query generated from the CSV file uploaded through the interface of FIG. 4D. The user interface of FIG. 4E includes a control that allows the operator to validate the cypher query. The user interface shown in FIG. 4F provides the operator with the ability to make changes to the graph formed based on the executed cypher query. FIG. 4G is a user interface that allows an operator to input additional nodes, attributes, labels and relationships to modify an existing graph or to prepare a new graph.

During testing and refinement stages, the conversion method described above can be gradually improved in terms of accuracy by the refinement of prompts using different LLMs such as GPT4 and GPT4-turbo. In addition, the mapping of the CSV file can be gradually refined to improve the accuracy cypher query generation.

Figure 5:
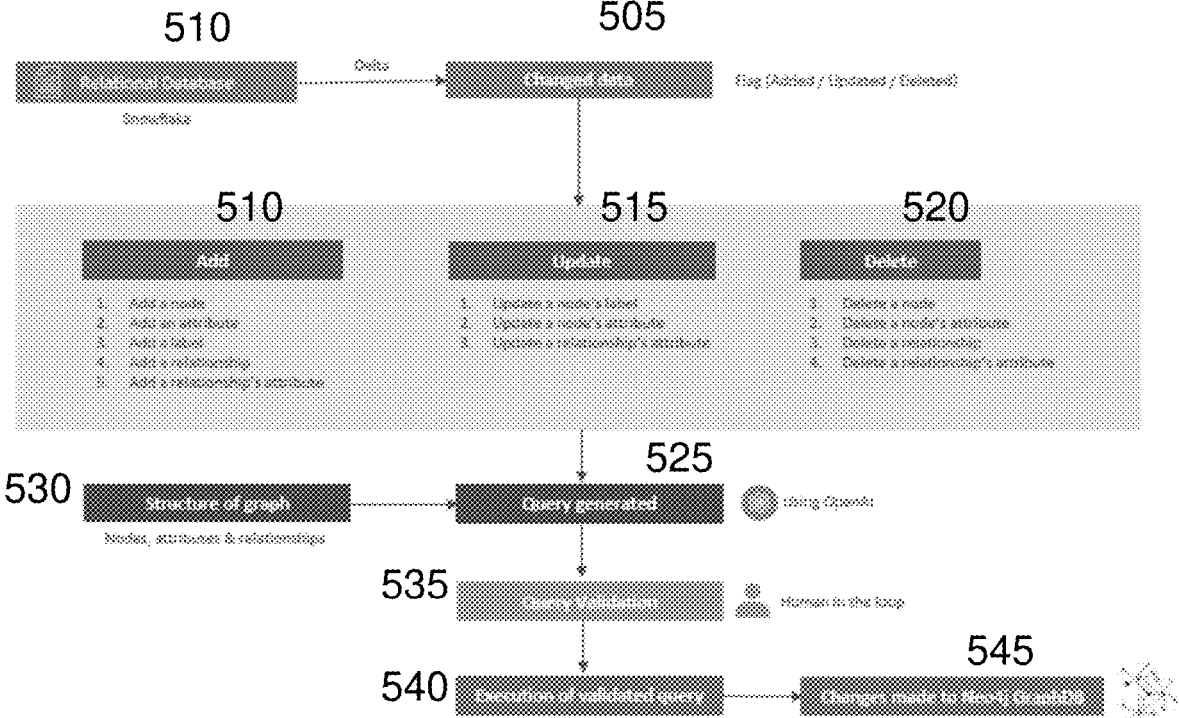
FIG. 5 is a schematic flow diagram of a data ingestion pipeline according to an embodiment of the present disclosure.

The present disclosure also describes a data ingestion pipeline that facilitates the seamless addition, updating, and deletion of entities in a graph database platform from a relational database source. The ingestion pipeline provides efficient processes for adding, updating, and deleting entities that ensure data integrity and consistency. The data ingestion framework is also scalable and adaptable to evolving data integration needs. FIG. 5 is a schematic flow diagram of a data ingestion pipeline 500 according to an embodiment of the present disclosure. The data ingestion flow starts with a request to change data 505 in relational database 510. The requested change can concern an add 510, such as adding a node, attribute, label relationship and/or relationship attribute. Alternatively, change request can comprise a data update 515 such as an update to a label, attribute or relationship attribute, or a delete 520 which is the inverse of an add comprising the removal of a node, attribute, relationship or relationship attribute. The change request is converted into a query which is generated 525 using an LLM based on the previously created graph structure 530. After the query is validated 535, it is executed 540 by the graph database platform, and the underlying data in the graph database platform is updated 545.

Figure 6A:
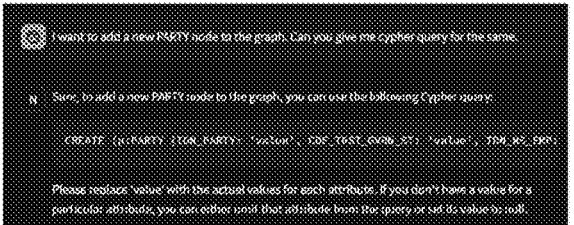
FIG. 6A is an exemplary user interface for enabling and guiding operators in the process of adding a node to a graph database.
Figure 6B:
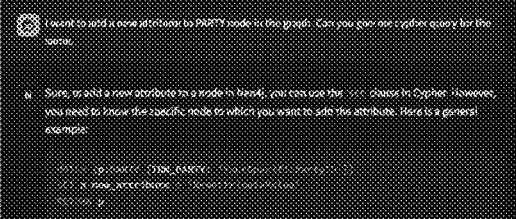
FIG. 6B is an exemplary user interface for enabling and guiding operators in the process of adding an attribute to a graph database.
Figure 6C:
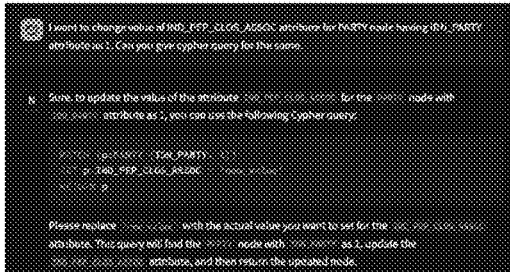
FIG. 6C is an exemplary user interface for enabling and guiding operators in the process of updating an attribute in a graph database.
Figure 6D:
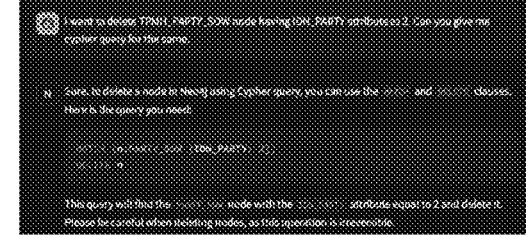
FIG. 6D is an exemplary user interface for enabling and guiding operators in the process of removing a node from a graph database.

FIGS. 6A-6D are exemplary user interfaces for enabling operators to implement the data ingestion change requests described above. FIG. 6A is an exemplary user interface that enables and guides operators in the process of adding a node to a graph database. FIG. 6B is an exemplary user interface that enables and guides operators in the process of adding an attribute to a graph database. Similarly, FIG. 6C is an exemplary user interface that enables and guides operators in the process of updating an attribute in a graph database. FIG. 6D is an exemplary user interface that enables and guides operators in the process of removing a node from a graph database.

Figure 7:
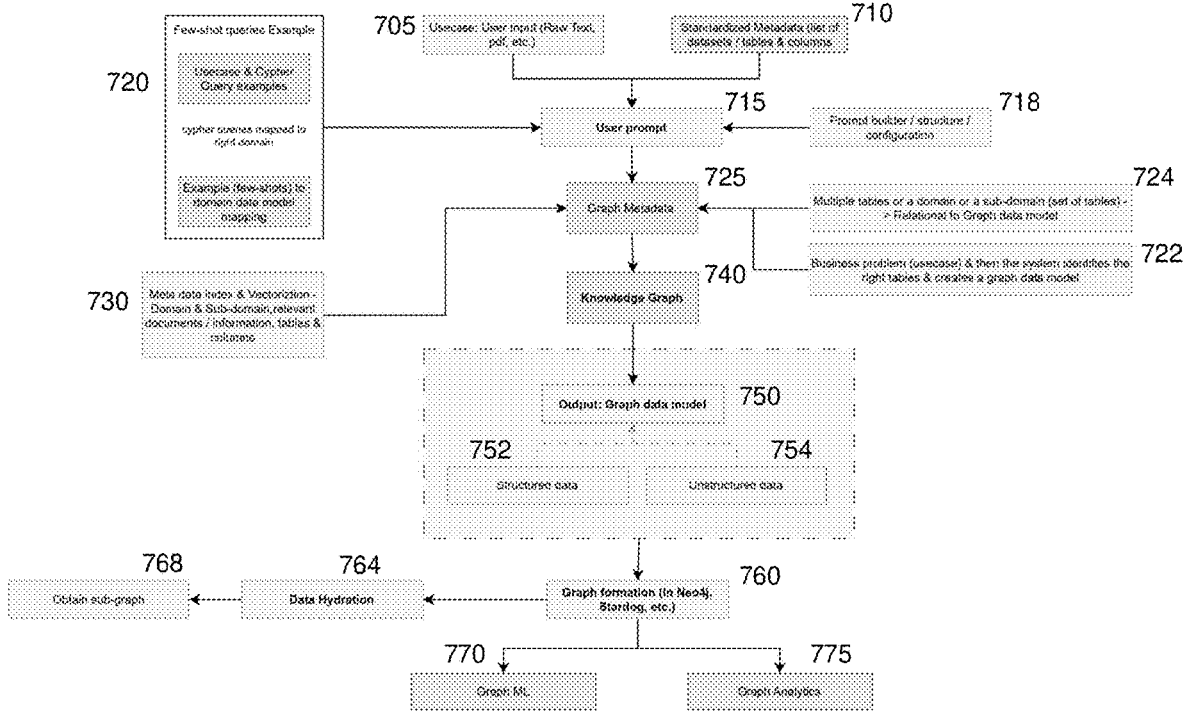
FIG. 7 is a flow chart of a more general method for generating a graph database using a large language model according to an embodiment of the present disclosure.

FIG. 7 is a flow chart of a more general method for generating a graph database using a large language model according to an embodiment of the present disclosure. The original sources of information for the method include user input 705 related to a use case and stored metadata 710 ("metadata store"). The user input 705 can comprise unstructured data. As noted above, unstructured data can comprise a wide variety of data sources including raw text. as well as any file that from which text can be extricated or transcribed (e.g., documents, pdfs, audio and video files). The universe of possible sources of information for query construction and metadata extraction is therefore potentially very wide, depending on the use case.

The metadata store 710 comprises lists of metadata taken from stored datasets, tables, column, etc. related to general business use cases. The metadata with the metadata store 710 can be obtained in an automated manner from review of the datasets. The user input 705 is used directly to aid in generating a user prompt 715, while the stored metadata 710 is simultaneously consulted to inform the prompt 715. The user prompt 715 can be created with the aid of a prompt builder 718 which can provide and interface and various structures/configurations for the user to select from. Additionally, the user can help train the LLM by submitting few-shot examples 720 such as previous query examples related to the user case. The user prompt 715 is fed to an LLM which analyses and extracts graph metadata 725 from the prompt 715. The graph metadata 725 is supplemented through additional sources determined by analysing the business use case 722. For example, the LLM can access tables and domains from a relational database 724 related to the use case. Furthermore, the graph metadata 725 can be refined using other sources such as vectorized metadata indexes, relevant documents, including, depending on the case, tables and/or domains from and other information 730.

The graph metadata 725 obtained from the query, as assembled from the various sources discussed above is used to generate a knowledge graph 740. As noted above the knowledge graph is generated by identifying the significant parts of metadata in terms of nodes (entities), relationships and attributes. After the knowledge graph has been assembled based on these inputs, the LLM is able to generate a graph data model 750. The graph data model 750 is based on both structured data taken from the knowledge graph as well as unstructured data. A graph 760 can be generated using a graph database platform such as Neo4j to display the graph data model 750.

After formation of the graph 760 processes such as data hydration 764 and sub-graph formation 768 can be performed. Data hydration 764 is the process of adding data into a graph database. Hydration can involve several steps, including data extraction, transformation, and loading. Data extraction involves retrieving data from various sources of structured data, such as relational databases, CSV files, or other systems, as well as unstructured data sources. Data transformation involves converting the extracted data into a format suitable for graph databases, including nodes, relationships, and properties. Data loading involves importing the transformed data into the graph database using tools such as Cypher LOAD CSV or APOC procedures. Rehydration is the inverse process of extracting data from a graph database and converting it into a format suitable for use in other applications or systems. This can involve querying the graph database using Cypher or other query languages, and then transforming the results into a format that can be consumed by other systems, such as CSV, JSON, or XML.

Lastly, once the graph 760 is formed graph-based machine learning processes 770 and graph-based analytics 775 can be applied to the graph database.

Figure 8:
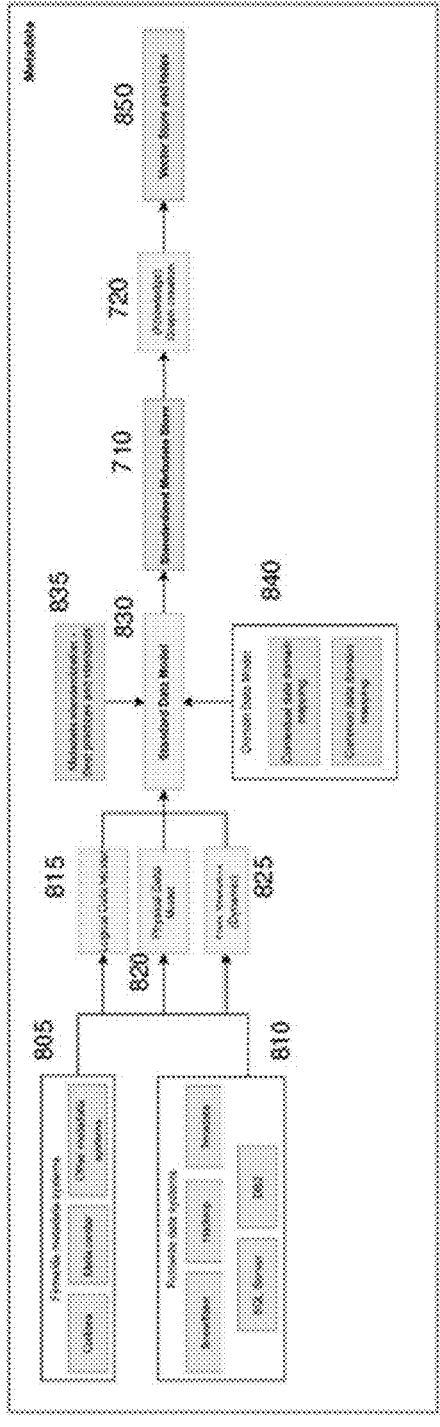
FIG. 8 is a flow diagram of an example method of obtaining or assembly a metadata store that forms one of the sources in the method of generating a graph database described.

FIG. 8 is a flow diagram of an example method of obtaining or assembly a metadata store 710 that forms one of the sources in the method of generating a graph database described. The original sources for assembling the metadata store include firmwide metadata systems 805 and firmwide data systems 810. The metadata systems 805 can include such systems and platforms as Collibra which is a data catalog platform that users to and link data to specific contexts. The data systems 810 can include data lakes or warehouses that store unstructured data, and can also include structured sources of data accessible through SQL Server or DB2 data management systems. The firmwide metadata systems 805 and firmwide data systems 810 provide metadata and data, respectively to a logical data model 815, a physical data model 820 and to a data/statistical model 825. The logical data model 815, physical data model 820 and statistical model 825 inform a standard data model 830. The standard data model 830 is also informed by practices and standards 835 for metadata standardization which can be configured, as well as domain data models 840. The standard data model, as informed by the practices and standards 835, and the domain model 840 is used to generate a standardized metadata store which is equivalent to the metadata store 710 shown in FIG. 7 which is used to generate a knowledge graph 720 or graph data model 750. Once the knowledge graph or graph data model have been generated, a vectorized store and index 850 of metadata suited to the graph form is generated.

Figure 9:
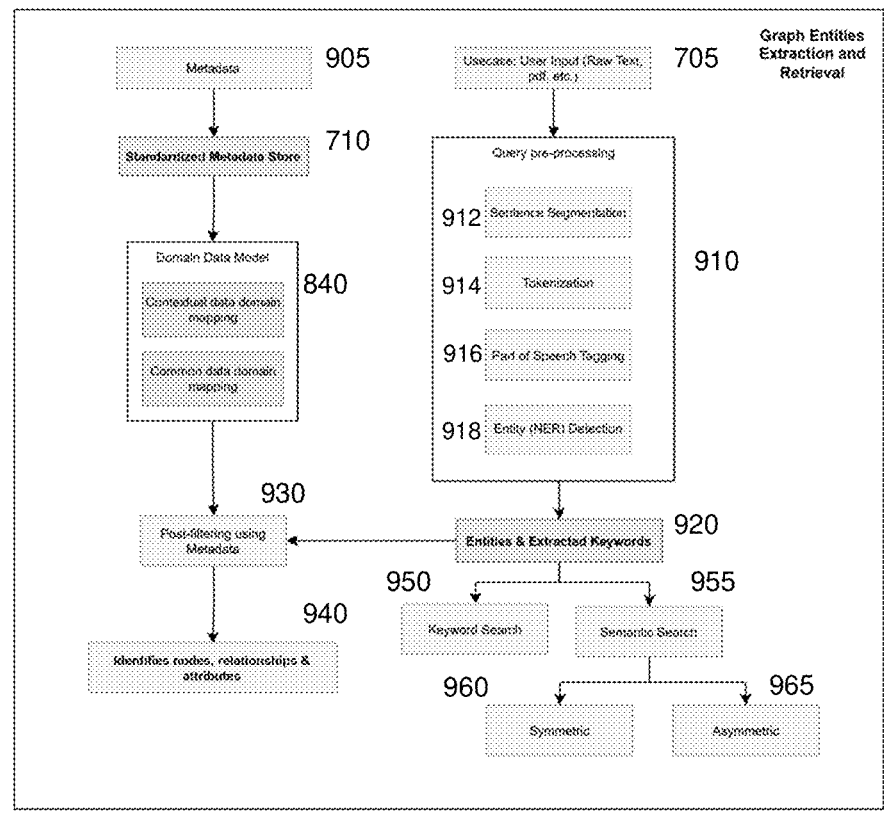
FIG. 9 is a flow diagram of a method of extraction of graph entities from metadata according using an LLM to an embodiment of the present disclosure.

FIG. 9 is a flow diagram of a method of extraction of graph entities from metadata according using an LLM to an embodiment of the present disclosure. Metadata 905 assembled from the various sources shown in FIG. 8 is received by the standardize metadata store 710. Domain data models 840 for contextual data domain mapping and common data domain mapping are applied to the metadata in the standardized metadata store 710. In a second branch of the process of FIG. 9, user input 705 (from FIG. 7) is provided to a query pre-processing module 910 that includes several sub-modules including, but not limited to a sentence segmentation sub-module 912, a tokenization sub-module 914, a part-of-speech tagging sub-module 916, and an entity detection sub-module 918. These sub-modules 912-918 collectively parse metadata text to locate graph metadata comprising or related to entities, relationships and attributes. In addition, each of the sub-modules 921-918 can be executed by the LLM. The query pre-processing module outputs entities and keywords 920. The data domain models 840 of the first branch and the entities and keywords 920 of the second branch provide data to a post-filtering module 930 which uses metadata to filter the entities and keywords. The post-filtering module 930 identifies and outputs the nodes, relationships and attributes 940 of a graph model. The entities and keywords 920 are also provided for keyword and semantic searches 950, 955. The semantic searches 955 yield either or both of symmetric and asymmetric data 960, 965.

Figure 10:
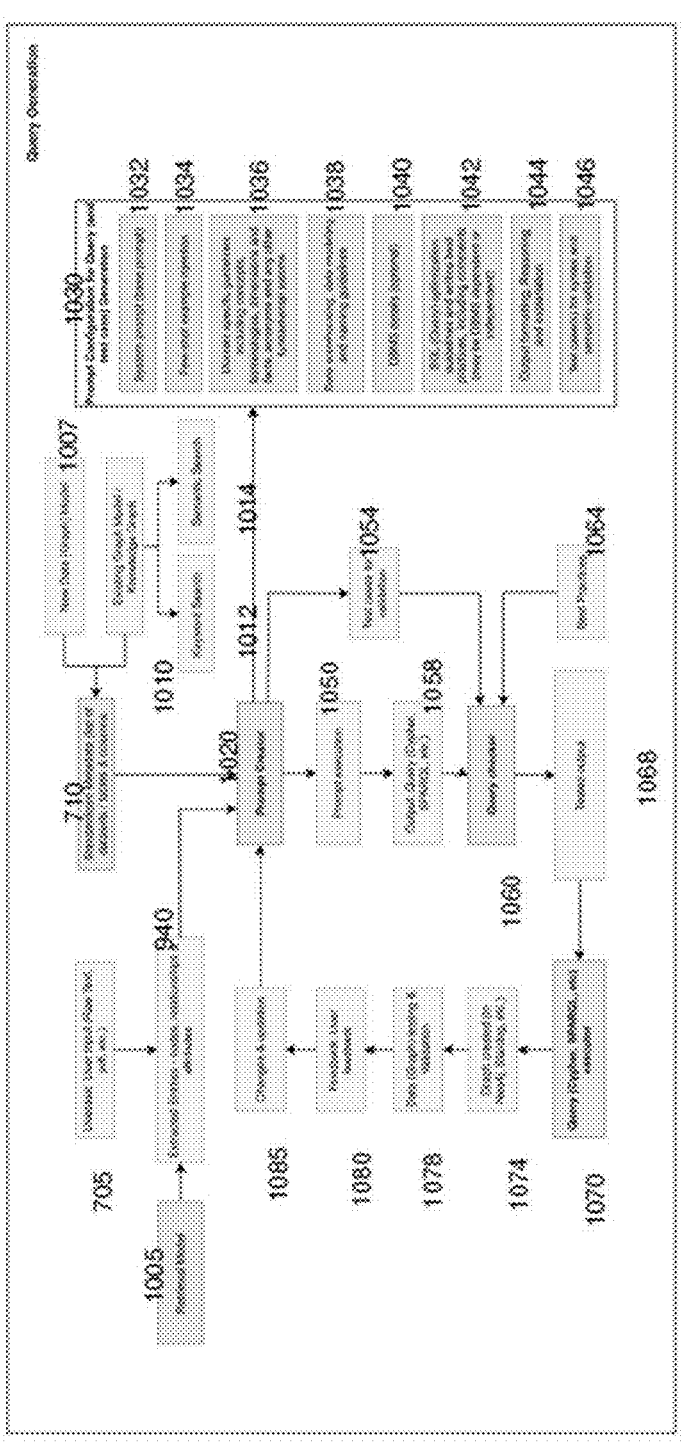
FIG. 10 is a flow diagram of a method of query generation using an LLM according to an embodiment of the present disclosure.

FIG. 10 is a flow diagram of a method of query generation using an LLM according to an embodiment of the present disclosure. As shown, from user inputs 705 and an LLM retrieval model 1005, entities, relationships and attributes are extracted 940. In another branch of the process, metadata from the metadata store 710 is fed to a prompt creator module 1020. The metadata store is informed by new and existing graph data models 1007, 1010. The existing graph data models 1110 can be used for keyword searches 1012 and semantic searches 1014. An operator can configure 130 the prompt creator using for query generation using various elements. As non-limiting examples the configuration elements include: system (base) prompts 1032; few-shot example injections 1034; domain specific guidelines 1036 including concepts, axioms, terminologies, dimensions, facts, acronyms, etc.; data warehousing, modeling and naming guidelines 1038; details of database management systems (DBMS) 1040; SQL optimization information 1042; output configurations including formatting and reasoning and test cases for syntax and semantic validation 1046.

Taking into account the configuration 1030, the prompt creator module 1020 executes prompts 1050 as well as test cases for validation 1054. The output of the prompt execution 1058 is a query (e.g., Cypher, SparQL). A query checker module 1060 uses best practices 1064 to yield a tested output 1068 which is delivered to a query executor 1070. The query executor 1070 generates a completion which is used to create a graph in graph database platform such as Neo4j. The graph is then tested and validated 1078; operators can provide feedback 1080 on the accuracy of the graph which can be used for updates to the LLM algorithm 1085.

The methods and processes described herein are performed by multiple computing devices (e.g., user devices, physical servers, workstations, storage arrays, cloud computing resources, etc.) that communicate and interoperate over one or more networks to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions or may be implemented in application-specific circuitry (e.g., ASICs or FPGAs) of the computer system. Where the computer system includes multiple computing devices, these devices can be, but need not be, co-located. The results of the disclosed methods and tasks can be persistently stored by transforming physical storage devices, such as solid-state memory chips or magnetic disks, into a different state. In some embodiments, the computer system may be a cloud-based computing system whose processing resources are shared by multiple distinct business entities or other users.

The methods described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium.

The modules described herein which are executed on one or more computing devices and information processors which can communicate with other information processors within the organization and outside of the organization sing data connections over a data network. Data connections can be any known arrangement for wired (e.g., high-speed fiber) or wireless data communication, using any suitable communication protocol, as known in the art.

It is to be understood that any structural and functional details disclosed herein are not to be interpreted as limiting the systems and methods, but rather are provided as a representative embodiment and/or arrangement for teaching one skilled in the art one or more ways to implement the methods.

It is to be further understood that like numerals in the drawings represent like elements through the several figures, and that not all components and/or steps described and illustrated with reference to the figures are required for all embodiments or arrangements.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

Terms of orientation are used herein merely for purposes of convention and referencing and are not to be construed as limiting. However, it is recognized these terms could be used with reference to a viewer. Accordingly, no limitations are implied or to be inferred.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

While the disclosure has been described with reference to exemplary embodiments, it will be understood by those skilled in the art that various changes may be made and equivalents may be substituted for elements thereof without departing from the scope of the disclosed invention. In addition, many modifications will be appreciated by those skilled in the art to adapt a particular instrument, situation or material to the teachings of the disclosure without departing from the essential scope thereof. Therefore, it is intended that the invention not be limited to the particular embodiment disclosed as the best mode contemplated for carrying out this invention, but that the invention includes all embodiments falling within the scope of the appended claims.

What is claimed is:

1. A computer-implemented method for generating a graph database comprising:

processing user input and stored metadata using a first processor configured by code to generate a prompt for input to a large language model (LLM);

dynamically supplementing the prompt using stored metadata from a relational database as well as a vectorized metadata index in a fused prompt building process;

using a second processor executing the LLM:

extracting graph metadata from the prompt;

generating a knowledge graph based on the graph metadata and using a knowledge graph platform that uses mapped extracted entities;

using a third processor:

generating a graph data model including both structured and unstructured data using the knowledge graph from both structured and unstructured data sources; and generating a graph on a graphic platform using the graph data model, wherein the step of generating the graph model includes:

refining metadata obtained in response to a user query to reduce a number of tokens for input to an LLM;

identifying parts of speech in the user query input, detecting entities, relationships, and attributes in the refined metadata using an LLM, and mapping extracted entities to file headers;

filtering the detected entities, relationships, and attributes based on a data domain model and metadata production standards.

2. The method of claim 1, further comprising:

prior to generating the prompt;

obtaining the stored metadata from a relational database in a first format; and extracting entity, relationship and attribute data pertinent to a knowledge graph from the stored metadata obtained from the relational database using the LLM.

3. The method of claim 2, further comprising converting the metadata in the first format into a shortened format prior to extracting the entity, relationship and attribute data from the metadata wherein the shortened format contains fewer than a threshold maximum number of tokens for the LLM.

4. The method of claim 1, wherein one or more query examples are provided to the LLM in addition to user input and stored metadata for prompt generation.

5. The method of claim 1, further comprising providing a business use case to the LLM to aid in determining correct source information for extracting the graph metadata from the prompt.

6. The method of claim 5, further comprising refining the graph metadata using additional information including one or more of: a metadata index, metadata vectorization, domain or sub-domain information related to the use case, and additional relevant structured or unstructured data.

7. The method of claim 1, further comprising hydrating the graph by adding data to the graph data model.

8. The method of claim 1, wherein the stored metadata is initially generated using initial stored data and metadata, a domain data model and a set of meta production standards.

*    *    *    *    *